US012304770B2

(12) United States Patent
Hawkrigg

(10) Patent No.: US 12,304,770 B2
(45) Date of Patent: May 20, 2025

(54) COILED SHEATH SYSTEM

(71) Applicant: William Hawkrigg, Henderson, NV (US)

(72) Inventor: William Hawkrigg, Henderson, NV (US)

(*) Notice: Subject to any disclaimer, the term of this patent is extended or adjusted under 35 U.S.C. 154(b) by 355 days.

(21) Appl. No.: 17/982,609

(22) Filed: Nov. 8, 2022

(65) Prior Publication Data

US 2024/0150151 A1 May 9, 2024

(51) Int. Cl.
*B65H 75/36* (2006.01)
*H01B 7/06* (2006.01)
*H01B 17/58* (2006.01)

(52) U.S. Cl.
CPC ............... *B65H 75/36* (2013.01); *H01B 7/06* (2013.01); *H01B 17/58* (2013.01)

(58) Field of Classification Search
CPC ..................................................... B65H 25/36
USPC ........................................................... 174/69
See application file for complete search history.

(56) References Cited

U.S. PATENT DOCUMENTS 2,795,641 A * 6/1957 Rowell ..................... F16F 1/04 379/438
2,955,149 A * 10/1960 Gubernick ........... H02G 11/006 267/74
6,433,282 B1 * 8/2002 Traversa .............. H02G 3/0475 174/95
6,444,912 B1 * 9/2002 Grossman ........... B60R 16/0215 174/99 R
6,724,613 B2 * 4/2004 Doshita ............... B60R 16/0215 174/136
7,939,760 B2 * 5/2011 Iwahara .............. B60R 16/0215 174/72 A
2014/0305673 A1 * 10/2014 Kulas ................... H04R 1/1033 174/69
2015/0307314 A1 * 10/2015 Matteo ................... B65H 75/36 242/615

* cited by examiner

*Primary Examiner* — Stanley Tso
(74) *Attorney, Agent, or Firm* — Dale J. Ream

(57) ABSTRACT

A coiled sheath system configured to receive a pair of cords includes a plurality of sheath bodies each including a plurality of spiral loops and each having first and second lobe portions extending between opposed ends of each said sheath body, respectively. Each sheath body is constructed of a resilient and flexible material that is movable between a stretched linear configuration and a relaxed coiled configuration such that the first and second cords are caused to adopt the configuration of first and second lobes when received therein, respectively. Each first lobe portion has a tubular configuration defining an interior area and a first slot in communication therewith for receiving a first cord into said first lobe interior area. Similarly, each second lobe portion has a tubular configuration defining an interior area and a second slot in communication therewith for receiving a second cord into said second lobe interior area.

13 Claims, 8 Drawing Sheets

COILED SHEATH SYSTEM

BACKGROUND OF THE INVENTION

This invention relates generally to holders of electrical cords so as to prevent said cords from becoming tangled such as under a desk or extending away from one or more appliances. More particularly, the present invention relates to a coiled sheath system that includes a plurality of coiled sheath bodies each having a pair of lobe portions each capable of holding a different cord such that multiple coiled sheath bodies may be used to hold and direct multiple cords more efficiently.

Setting up a computer, whether at home or at a commercial place of business, almost always simultaneously setting up a telephone, an Internet router, a printer, speakers, a mouse, a desk lamp, and potentially other peripherals and accessories. Each electronic device typically includes an electrical cord and one or more data cables extending between the electronic device and an available wall outlet or a power strip. In addition, each cord or cable is typically very long so as to reach a respective wall outlet which is often a considerable distance away from the electronic device. That said, and particularly when multiple workstations are established adjacent one another, the tangle of cords and cables beneath a desk for modular table is undesirably untidy, unacceptably tangled, and unsightly. Sorting out the mess of cables, such as when a repair or replacement is needed, becomes confusing and laborious.

Therefore, it would be desirable to have a coiled sheath system having a plurality of sheath bodies that each have a pair of adjacent lobes configured to receive a pair of cords or cables and holding them together in a coiled configuration that reduces their length dramatically. For example, a sheath body could be used to hold and direct both an electrical cord and data cable of a telephone so as to keep that pair of cords together. Then, another sheath body may be used to direct two electricity cords to an electric outlet while still another sheath body may be used to direct two data cables to a computer. In other words, the plurality of sheath bodies allows a plurality of cables and cords to be organized in ways not possible with single sheath constructions.

SUMMARY OF THE INVENTION

Therefore, a coiled sheath system configured to receive at least a pair of electrical cords according to the present invention, includes a plurality of sheath bodies each of which has an elongate configuration and includes a first lobe portion and a second lobe portion extending between opposed ends of the sheath body. Each sheath body is constructed of a resilient and flexible material that is movable between a stretched linear configuration and a relaxed coiled configuration. In an embodiment, the first lobe portion of a first respective sheath body has a tubular configuration defining a first lobe interior area and defining a first slot in communication with the first lobe interior area configured to receive a first cord into the first lobe interior area. Similarly, the second lobe portion of the first respective sheath body has a tubular configuration defining a second lobe interior area and defining a second slot in communication with the second lobe interior area configured to receive a second cord into the second lobe interior area.

In another aspect, the plurality of sheath bodies includes a second respective sheath body also having first and second lobe portions. In an embodiment, the respective first lobe portion of the second respective sheath body is configured to receive a downstream portion of the first cord. Further, the respective second lobe portion of the second respective sheath body is configured to receive a third cord that is otherwise unassociated with the first or second cords described previously.

In this manner, the plurality of sheath bodies each having a pair of lobes may be arranged so as to receive and direct a plurality of electrical, telephone, data, or medical tubing cords with greater efficiency and complexity than coiled sheath devices having only a single lobe.

Therefore, a general object of this invention is to provide a coiled sheath system having a plurality of coiled sheath bodies each having a pair of adjacent lobe portions each being configured to receive a medical or technology cord in a coiled configuration and, as a result, organizing otherwise tangled cords or cables.

Another object of this invention is to provide the coiled sheath system, as aforesaid, in which the plurality of coiled sheath bodies may be used together to directionally organize pairs of cables that may be delivering current or data to or from different directions or from unrelated appliances.

Still another object of this invention is to provide a coiled sheath system, as aforesaid, in which each sheath body includes a plurality of spiral coils/loops each having a construction that is stretchable to a substantially linear configuration that is flexible to receive a functional cord portion and that is resilient to return to a coiled configuration.

Yet another object of this invention is to provide a coiled sheath system, as aforesaid, in which each sheath body may include a wire or wire coating that is overlaid with a thermoplastic or rubber insulative material that is naturally biased toward the coiled configuration.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
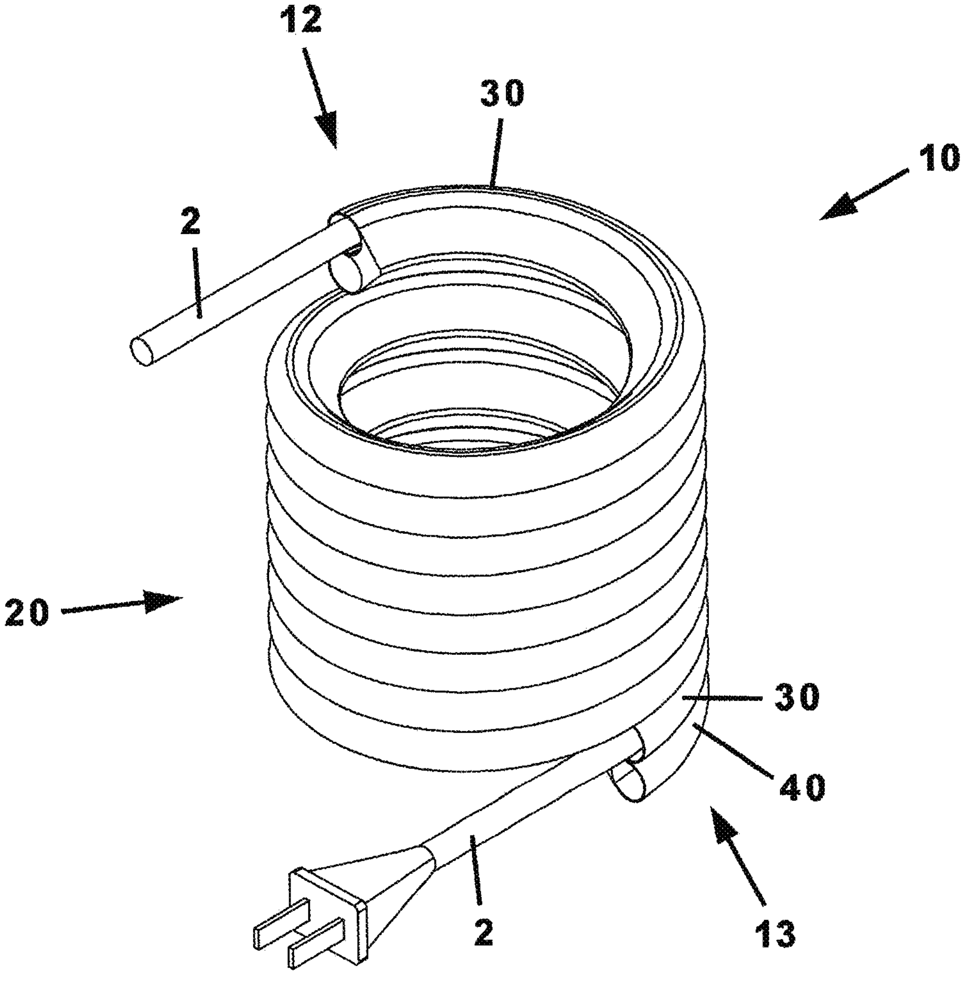
FIG. 1 is a perspective view of a coiled sheath taken from a coiled sheath system according to a preferred embodiment of the present invention, illustrated in a coiled or retracted configuration.
Figure 2:
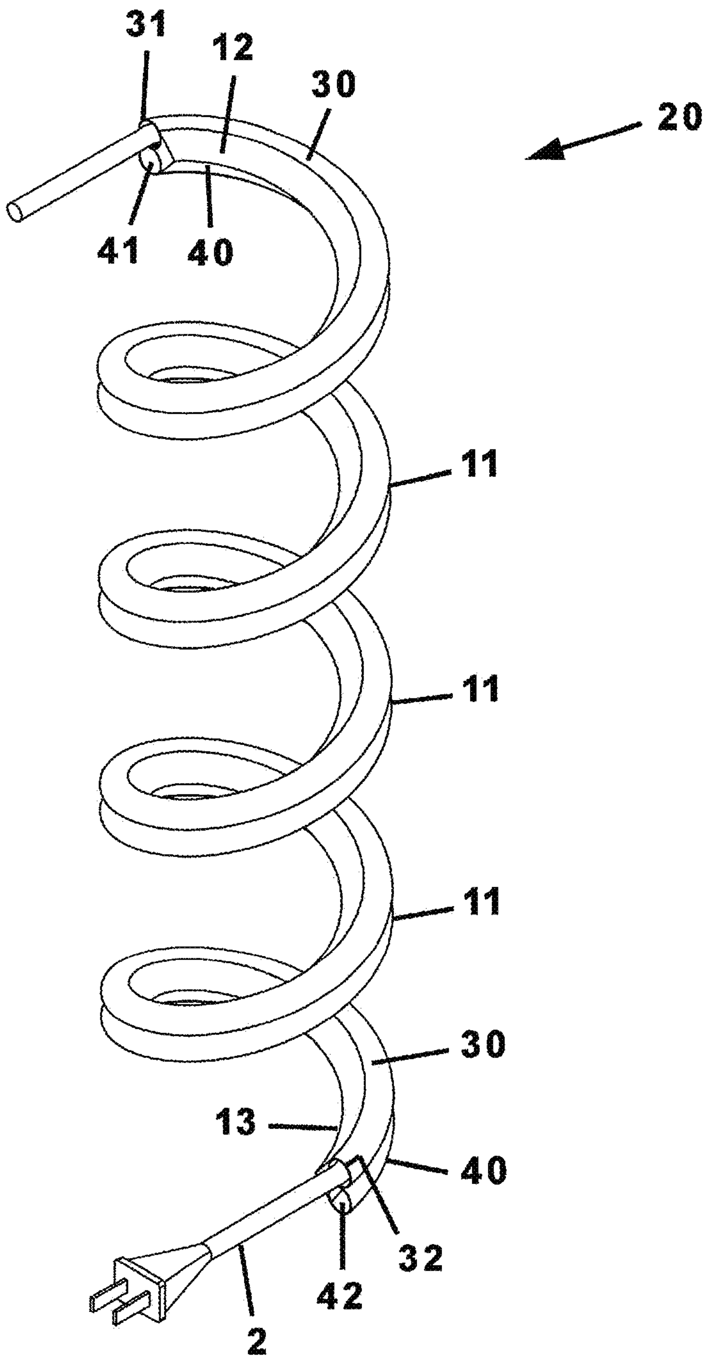
FIG. 2 is an area. perspective view of the coiled sheath system as in FIG. 1, illustrated in a stretched or flexed configuration.
Figure 3:
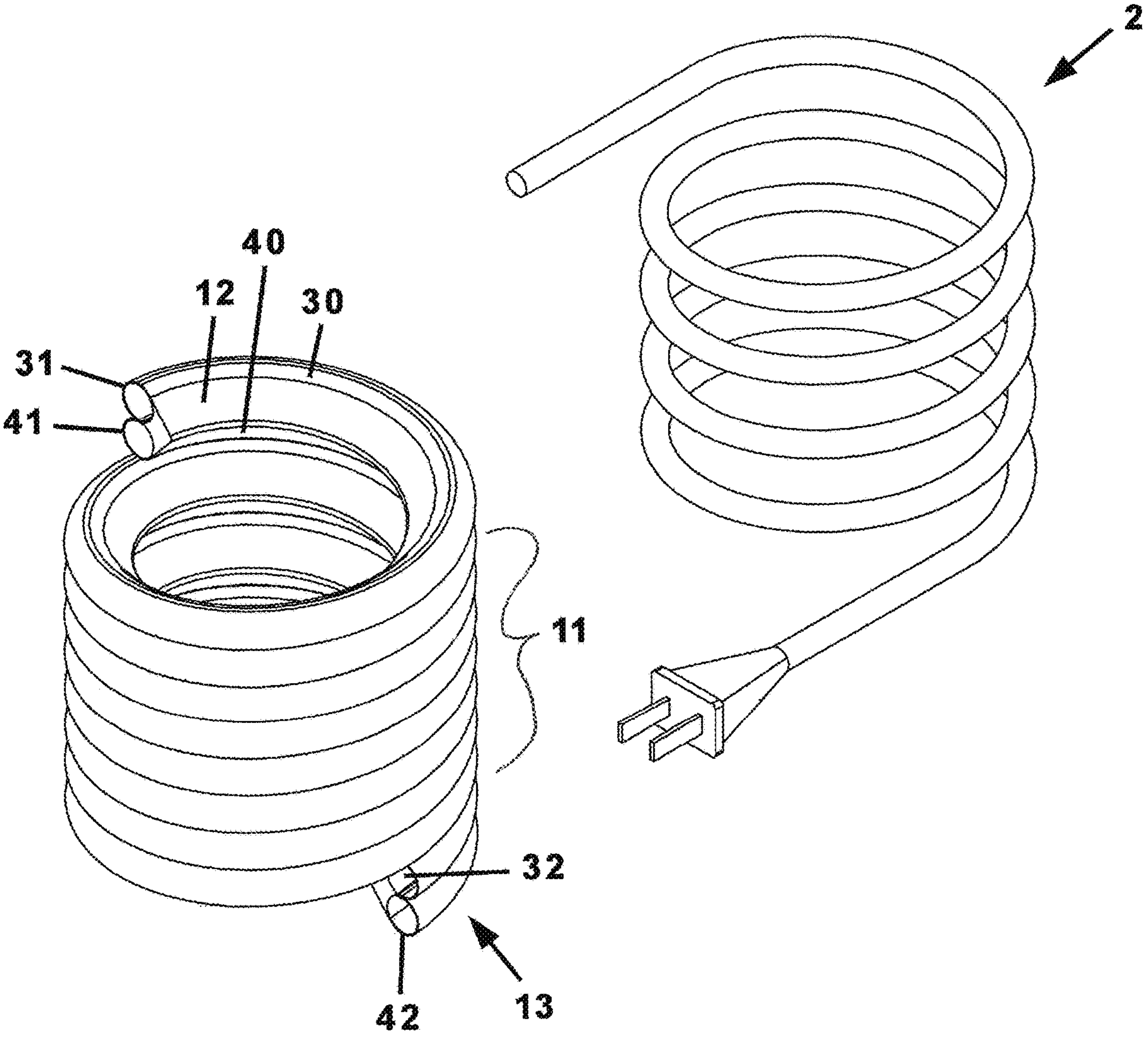
FIG. 3 is a perspective view of the coiled sheath system as in FIG. 1, illustrated with a cord/cable removed from a respective sheath body.
Figure 4A:
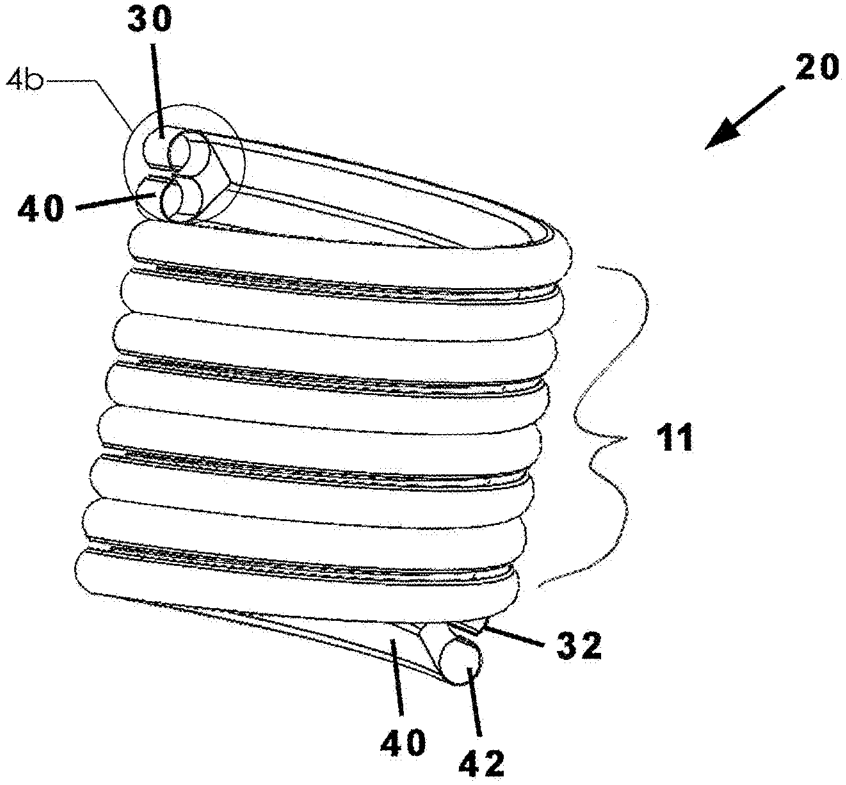
FIG. 4*a* is a side view of a sheath body according to the present invention.
Figure 4B:
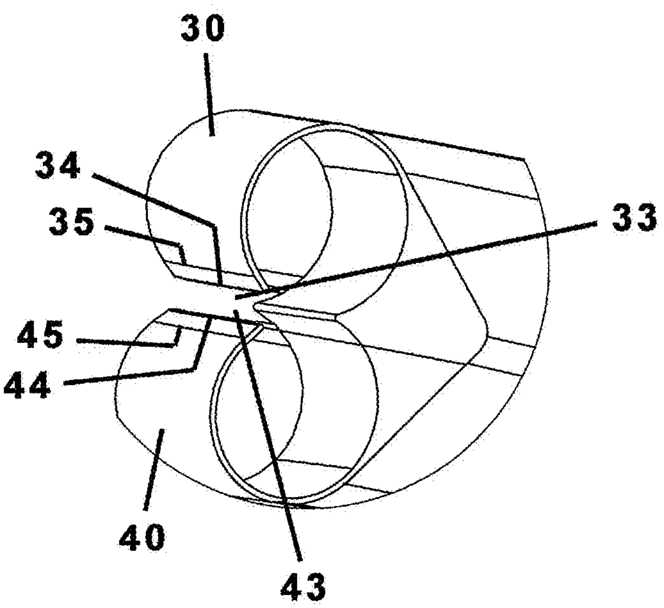
FIG. 4*b* is an isolated view on an enlarged scale taken from FIG. 4*a;*

A coiled sheath system according to a preferred embodiment of the present invention will now be described with reference to FIGS. 1 to 8 of the accompanying drawings. The coiled sheath system 10 may include a plurality of coiled sheath bodies 20 each of which includes a first lobe portion 30 and a second lobe portion 40 that are, together, arranged as a plurality of spiral or coiled loops 11 configured to receive a pair of electricity, data, telephonic, or medical tubing cords.

First, the coiled sheath system 10 may include a plurality of coiled sheath bodies 20. Each sheath body 20 includes an identical construction, even though individual sheath bodies may be referred to as an auxiliary sheath body, a first respective sheath body, a second respective sheath body, or the like, it being understood that such terms are used for the sake of clarity and understanding the full scope of how the plurality of sheath bodies 20 may be used together to hold and direct a plurality of cables extending away from multiple electronic devices. Although having the same construction, it will be discussed how a first sheath body 20*a* may be used to hold and direct a first cord 2 and a second cord 3 in a same direction, and a second sheath body 20*b* may be used to hold and direct another portion of the same first cord 2 and second cord 3 in opposing directions. Further, a third sheath body 20*c* may be used to hold and direct another portion of the same first cord 2 along with a third cord 4 having no association with either the first cord 2 or second cord 3.

Similarly, a third respective sheath body 20*c* may be used to hold and direct another portion of the same second cord 3. Accordingly, use of the coiled sheath system 10 enables a plurality of cords, tubing, and the like to be held and directed more efficiently and using fewer components than with any prior art device.

More particularly, each sheath body 20 includes a plurality of spiral loops 11 having a unitary construction and extending in an elongate configuration between a first end 12 and a second end 13 that is opposite and spaced apart from the first end 12. Further, each sheath body 20 may be constructed from a flexibly resilient material that is stretchable and movable between a stretched configuration that may be substantially linear in its configuration (FIGS. 1 and 2) and a relaxed configuration that is automatically and naturally arranged in a coiled configuration analogous to a compression spring (FIG. 1). In an embodiment, no metal, wires, or spring are needed but, rather, specific plastic material may be extruded in a specific manner in configuration using a subset of plastic materials and heat to yield the spiral or coiled configuration that is naturally biased toward the coiled configuration when relaxed, i.e., when not being stretched by a user as will be described in greater detail later. For example, each sheath body 20 may be constructed using stretchable and resilient plastic materials such as thermoset rubber, thermoplastic rubber, polyurethane, polytetrafluoroethylene, or another similar polymer having elastic and resilient properties.

In even further detail, each sheath body 20 includes a first lobe portion 30 having an elongate and tubular configuration and a second lobe portion 40 having an elongate and tubular configuration, the second lobe portion 40 being immediately and laterally adjacent to the first lobe portion 30. The first and second lobe portions 30, 40 extend longitudinally between the first end 12 and second end 13. The first lobe portion 30 defines a first interior area and has open proximal and distal ends 31, 32 each being in fluid communication with the first interior area. Similarly, the second lobe portion 40 defines a second interior area and has open proximal and distal ends 41, 42 each being in fluid communication with the second interior area. It is understood that the open ends of the first and second lobe portions will enable cords received within respective interior areas to both enter and exit as will be discussed in more detail later.

In another aspect, the first lobe portion 30 defines a first slot 33 extending the entire longitudinal extent between the proximal and distal ends 31, 32 thereof. It will be appreciated that the first slot 33 creates a first free edge 34 extending longitudinally between proximal and distal ends 31, 32. Conversely, it may accurately be seen that the first free edge 34 defines the first slot 33. Similarly, the second lobe portion 40 defines a second slot 43 extending the entire longitudinal extent between the proximal and distal ends 41, 42 thereof. It will be appreciated that the second slot 43 creates a second free edge 44 extending longitudinally between proximal and distal ends 41, 42.

As it was described of each sheath body 20, the first lobe portion 30 is constructed of a flexible and resilient material such that a pulling force on said first free edge 34 causes the first lobe portion 30 to move from a closed configuration blocking access to the first lobe interior area to an open configuration permitting access to said first lobe interior area. Access to the interior area enables reception of a cable therein. Similarly, as it was described of each sheath body 20, the second lobe portion 40 is constructed of a flexible and resilient material such that a pulling action on said second free edge 44 causes said second lobe portion 40 to move between a closed configuration blocking access to said second lobe interior area to an open configuration permitting access to the second lobe interior area. Access to the interior area enables reception of a cable therein. It is understood that the material and mode of construction causes the first lobe portion and the second lobe portion to be automatically biased toward (i.e., flex toward) the closed configurations until pulled away therefrom, such as by user.

In another aspect, each of the first free edge 34 and second free edge 44 includes a line of indicia so as to be easier to locate when a user desires to reveal a respective interior area into which a cable may be received. More particularly, the first lobe portion 30 includes a first line of indicia 35, such as a color indicium imprinted along and adjacent to the first slot 33. Similarly, the second lobe portion 40 includes a second line of indicia 45, such as a color indicium imprinted along and adjacent to the second slot 44.

Figure 5A:
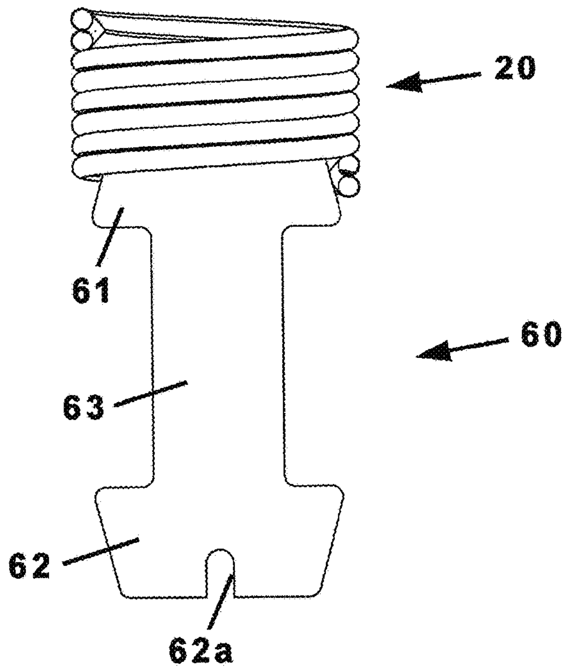
FIG. 5*a* is a side view of a winding tool being inserted into an interior bore defined by a sheath body according to the present invention.
Figure 5B:
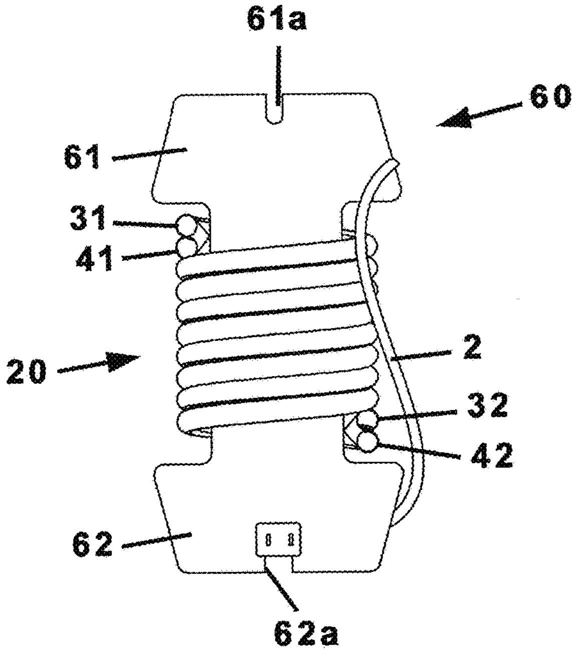
FIG. 5*b* is another side view, on a smaller scale, of the winding tool of FIG. 5*a*, illustrating the winding tool being fully inserted into the sheath body.
Figure 5C:
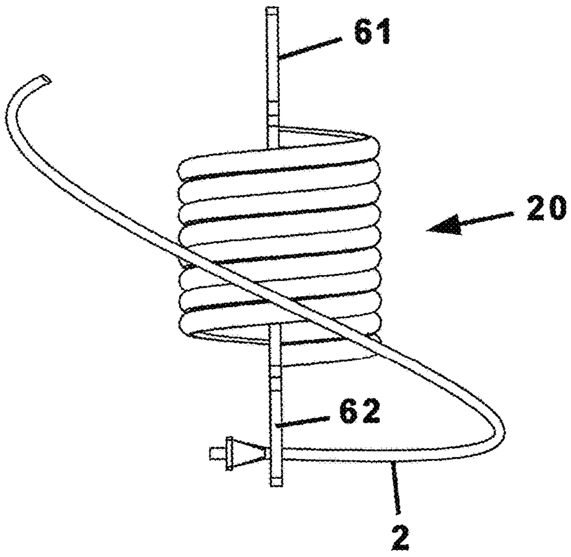
FIG. 5*c* is another side view rotated 90° from that shown in FIG. 5*b;*
Figure 6A:
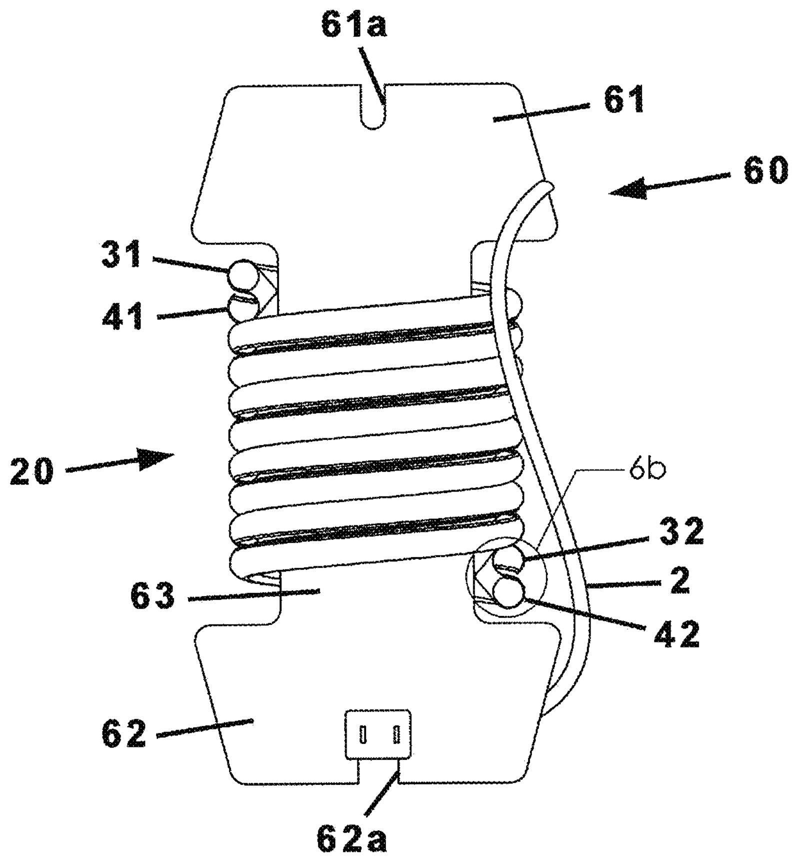
FIG. 6*a* is another side view of the winding tool as in FIG. 5*b;*
Figure 6B:
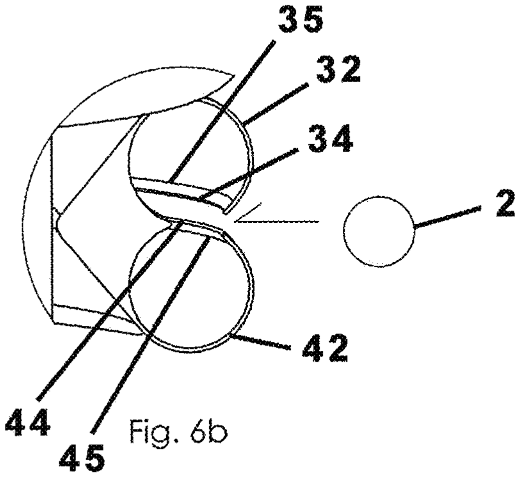
FIG. 6*b* is an isolated view on an enlarged scale taken from FIG. 6*a*, illustrated to demonstrate insertion of a cable into a respective lobe according to the present invention.
Figure 7:
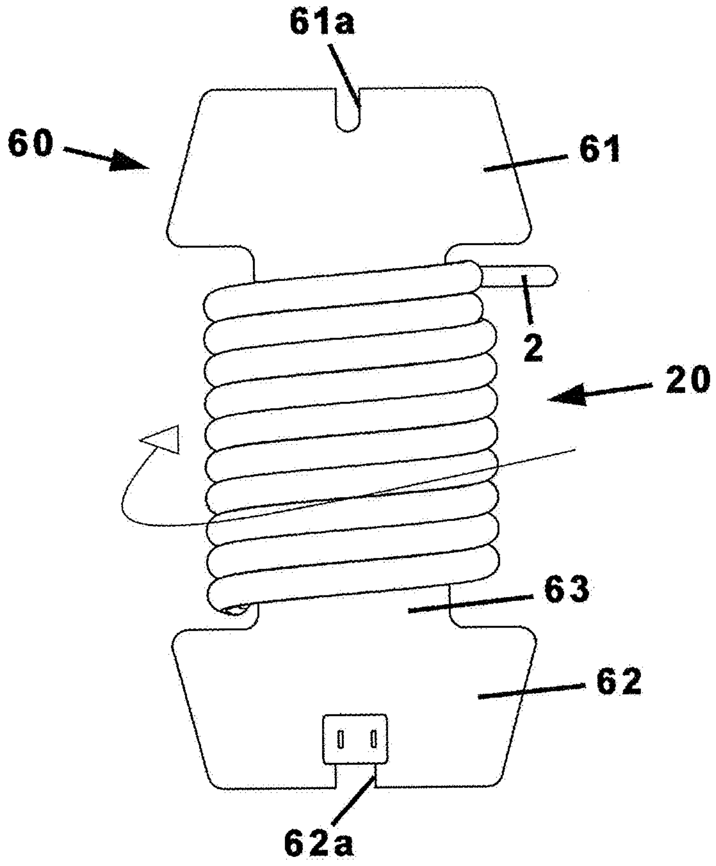
FIG. 7 is a front view of a coiled body mounted on a winding tool, illustrated rotating in a winding motion as taught by the present invention.
Figure 8:
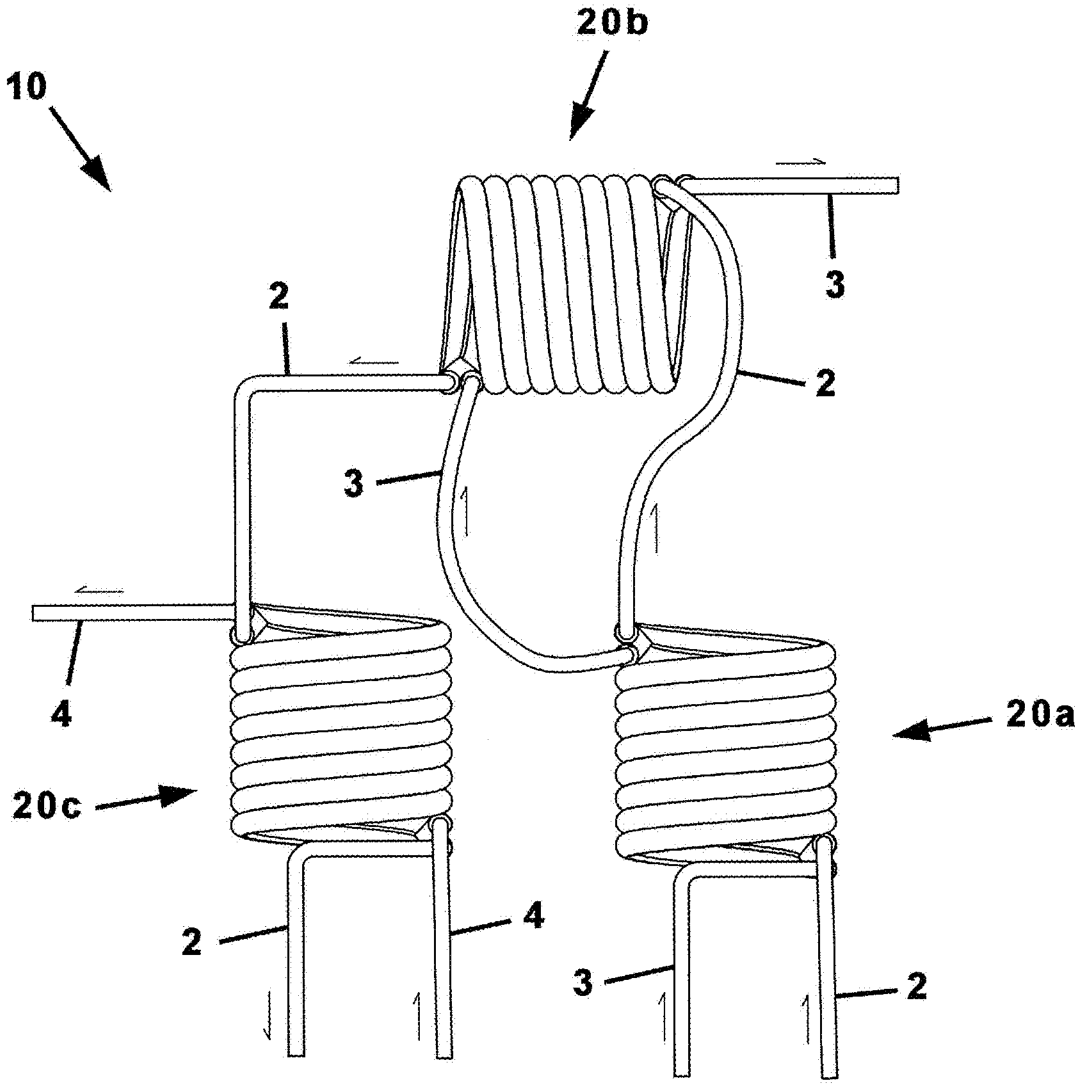
FIG. 8 is a coiled sheath system according to a preferred embodiment of the present invention in use with three electrical or data cords.

In another aspect, the coiled sheath system 10 may include a winding tool 60 that is useful for holding the lobe portions at their close configurations, respectively, as well as providing enhanced dexterity for inserting an electrical or computer cable into the interior areas of the first and second lobe portions, respectively (FIG. 5). More particularly, the winding tool 60 may include an upper section 61 and an opposed lower section 62 with a bridge section 63 extending therebetween. Overall, the winding tool 60 has a planar or flat configuration and may be constructed of cardboard or similar semi-flexible stock such that the winding tool 60 may be bent briefly to be inserted through a center bore defined by the coiled sheath system 10 when closed/curled. In an embodiment, the upper section 61 and the lower section 62 have a trapezoidal configuration and each define a notch 61*a*, 62*a*, respectively, suitable for receiving a plug and of the cord captured by the sheath body 20. It is understood that a cable or cord may be inserted into a respective lobe portion in a manner substantially similar to that described above (such as by selectively flexing an open edge of a respective lobe portion) and then repeatedly twisted/rotated such that the received cable is wound into the respective interior area.

In use, the coiled sheath system 10 includes a plurality of spiral loops configured to move between a tightly coiled configuration in the manner of loops surrounding an axle (FIG. 1) and a stretched or flexed configuration having a loosely coiled configuration or, if stretched even further, and almost linear configuration. The coiled sheath system 10 includes a pair of parallel lobe portions 30, 40, each of which defines an interior area and flexible wall structures such that an electrical, telephone, or data cable may be received into the interior area, respectively. Preferably, the coiled sheath system 10 includes a plurality of sheath bodies 20 that may be arranged remotely from one another such that some cables may be shared by respective sheath bodies 20 while others direct cables not otherwise shared with upstream cables. Accordingly, the parallel lobe portions and plurality of sheath bodies 20 enhance the capability to direct and organize a complexity of electrical, telephone, and data cords in a residential or commercial environment or to similarly organize otherwise disorganized fluid-bearing tubes in a medical facility.

It is understood that while certain forms of this invention have been illustrated and described, it is not limited thereto except insofar as such limitations are included in the following claims and allowable functional equivalents thereof.

The invention claimed is:

1. A coiled sheath system configured to receive at least a pair of electrical cords, comprising:

a sheath body that includes an elongate configuration having a first end and a second end opposite said first end, said first sheath body having a first lobe portion and a second lobe portion adjacent to said first lobe portion, said first lobe portion and said second lobe portion extending between said first and second ends of said sheath body;

wherein:

said first lobe portion has a tubular configuration defining a first lobe interior area and defining a first slot in communication with said first lobe interior area configured to receive a first cord into said first lobe interior area;

said second lobe portion has a tubular configuration defining a second lobe interior area and defining a second slot in communication with said second lobe interior area configured to receive a second cord into said second lobe interior area;

said sheath body is constructed of a resilient and flexible material that is movable between a stretched linear configuration and a relaxed coiled configuration such that the first and second cords are caused to adopt the configuration of first and second lobes when received therein, respectively;

wherein:

said first lobe portion is constructed of a flexible and resilient material such that, in cooperation with said first slot, said first lobe portion is movable between a closed configuration blocking access to said first lobe interior area and an open configuration permitting access to said first lobe interior area; and said second lobe portion is constructed of a flexible and resilient material such that, in cooperation with said second slot, said second lobe portion is movable between a closed configuration blocking access to said second lobe interior area and an open configuration permitting access to said second lobe interior area;

said first lobe portion includes a first line of indicia extended along and adjacent to said first slot; and said second lobe portion includes a second line of indicia extended along and adjacent to said second slot.

2. The coiled sheath system as in claim 1, wherein:

said first lobe portion is configured to direct electrical current in a downstream direction; and said second lobe portion configured to direct electrical current in an upstream direction.

3. The coiled sheath system as in claim 1, further comprising:

an auxiliary sheath body including an auxiliary first lobe portion and an auxiliary second lobe portion adjacent said auxiliary first portion;

said auxiliary first lobe portion has a tubular configuration defining a first lobe interior area configured to receive a downstream portion of the first cord;

said auxiliary second lobe portion has a tubular configuration defining a second lobe interior area configured to receive a third cord different from the first cord and the second cord.

4. The coiled sheath system as in claim 1, wherein:

said first lobe portion is automatically biased toward said closed configuration; and said second lobe portion is automatically biased toward said closed configuration.

5. The coiled sheath system as in claim 1, wherein:

said first lobe portion includes a first free edge extending along said first slot;

said second lobe portion includes a second free edge extending along said second slot;

wherein said first free edge is immediately adjacent to said second free edge and said closed configurations, respectively.

6. The coiled sheath system as in claim 1, wherein said sheath member is automatically biased toward said relaxed coiled configuration.

7. The coiled sheath system as in claim 1, wherein:

said first lobe portion includes opposed proximal and distal ends each having an open configuration in communication with that first lobe interior area; and said second lobe portion includes opposed proximal and distal ends each having an open configuration in communication with that second lobe interior area.

8. The coiled sheath system as in claim 1, wherein said sheath body includes a plurality of axially aligned spiral loops constructed of an elastic material including one of thermoset rubber, thermoplastic rubber, polyurethane, or polytetrafluoroethylene.

9. A coiled sheath system configured to receive at least a pair of electrical cords, comprising:

a plurality of sheath bodies that each includes an elongate configuration having a first end and a second end opposite said first end, said each sheath body having a first lobe portion and a second lobe portion adjacent to said first lobe portion, said first lobe portion and said second lobe portion extending between said first and second ends of said sheath body;

wherein said sheath body is constructed of a resilient and flexible material that is movable between a stretched linear configuration and a relaxed coiled configuration;

wherein:

said first lobe portion of a first respective sheath body has a tubular configuration defining a first lobe interior area and defining a first slot in communication with said first lobe interior area configured to receive a first cord into said first lobe interior area;

said second lobe portion of said first respective sheath body has a tubular configuration defining a second lobe interior area and defining a second slot in communication with said second lobe interior area configured to receive a second cord into said second lobe interior area;

a respective first lobe portion of a second respective sheath body has a tubular configuration defining a first lobe interior area and defining a first slot in communication with said first lobe interior area configured to receive a downstream portion of the first cord into said first lobe interior area;

a respective second lobe portion of said second respective sheath body has a tubular configuration defining a second lobe interior area and defining a second slot in communication with said first lobe interior area configured to receive a third cord into said second lobe interior area, said third cord being unassociated with said first cord and said second cord;

said first lobe portion includes a first free edge extending along said first slot;

said second lobe portion includes a second free edge extending along said second slot;

said first free edge is immediately adjacent to said second free edge in said closed configurations, respectively;

said first lobe portion is constructed of a flexible and resilient material such that a pulling action on said first free edge causes said first lobe portion to move from a closed configuration blocking access to said first lobe interior area to an open configuration permitting access to said first lobe interior area;

said second lobe portion is constructed of a flexible and resilient material such that a pulling action on said second free edge causes said second lobe portion to move between a closed configuration blocking access to said second lobe interior area to an open configuration permitting access to said second lobe interior area;

said first lobe portion includes a first line of indicia extending along and adjacent to said first free edge; and said second lobe portion includes a second line of indicia extending along and adjacent to said second free edge.

10. The coiled sheath system as in claim 9, wherein:

said first lobe portion is automatically biased toward said closed configuration; and said second lobe portion is automatically biased toward said closed configuration.

11. The coiled sheath system as in claim 10, wherein said each sheath member is automatically biased toward said relaxed coiled configuration.

12. The coiled sheath system as in claim 9, wherein said each sheath body includes a plurality of axially aligned spiral loops constructed using an elastic insulation material including one of thermoset rubber, thermoplastic rubber, polyurethane, or polytetrafluoroethylene.

13. The coiled sheath system as in claim 9, wherein said each sheath body includes a thermoset rubber jacket having a plurality of axially aligned spiral loops that are, together, movable between a stretched linear configuration and a relaxed coiled configuration such that cords received therein are caused to adopt the configuration of said plurality of axially aligned spiral loops, respectively.

* * * * *